(12) United States Patent
Janczek et al.

(10) Patent No.: US 6,364,205 B1
(45) Date of Patent: Apr. 2, 2002

(54) CHIP CARD HAVING A CONTACT ZONE AND METHOD OF PRODUCING SUCH A CHIP CARD

(75) Inventors: Thies Janczek, Flintbek; Peter Stampka, Schwandorf-Klardorf, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/292,267

(22) Filed: Apr. 15, 1999

Related U.S. Application Data

(63) Continuation of application No. PCT/DE97/01919, filed on Sep. 2, 1997.

(30) Foreign Application Priority Data

Oct. 15, 1996 (DE) .......................... 196 42 563

(51) Int. Cl.[7] .............................. C06K 5/00; B32B 9/04; B05D 5/12; B05D 5/00
(52) U.S. Cl. ...................... 235/380; 428/411.1; 427/58; 427/96; 427/282
(58) Field of Search ........................ 257/499; 361/737; 360/2; 283/82, 904; 428/195, 411.1, 141, 142, 147; 427/58, 96, 97, 282, 380; 235/448

(56) References Cited

U.S. PATENT DOCUMENTS

| | | | | |
|---|---|---|---|---|
| 4,853,155 A | * | 8/1989 | Kurasawa | 252/512 |
| 5,213,715 A | * | 5/1993 | Patterson et al. | 252/518 |
| 5,612,087 A | | 3/1997 | Hayashi et al. | 427/226 |
| 5,671,525 A | * | 9/1997 | Fidalgo | 29/600 |
| 5,879,761 A | * | 3/1999 | Kulesza et al. | 427/555 |

FOREIGN PATENT DOCUMENTS

| | | |
|---|---|---|
| EP | 0 340 421 A2 | 11/1989 |
| FR | 2744269 A1 * | 8/1997 |

\* cited by examiner

*Primary Examiner*—Paul Thibodeau
*Assistant Examiner*—Sheeba Ahmed
(74) *Attorney, Agent, or Firm*—Herbert L. Lerner; Laurence A. Greenberg; Werner H. Stemer

(57) ABSTRACT

A chip card has a contact zone on which an electrically conductive lacquer applied. The electrically conductive lacquer is based on an intrinsically conductive plastic material. Pigments are added to the electrically conductive lacquer. In an alternative embodiment an electrically nonconductive lacquer is applied to the contact zone. Conductive particles are disposed in the electrically nonconductive lacquer. The electrically conductive lacquer forms a covering for the conductive particles. A method of lacquering a contact zone and a method of producing a chip card are also provided.

10 Claims, 1 Drawing Sheet

CHIP CARD HAVING A CONTACT ZONE AND METHOD OF PRODUCING SUCH A CHIP CARD

CROSS-REFERENCE TO RELATED APPLICATION

This application is a continuation of copending International Application No. PCT/DE97/01919, filed Sep. 2, 1997, which designated the United States.

BACKGROUND OF THE INVENTION

Field of the Invention

The invention relates to a chip card having a contact zone, in a region of which an electrically conductive lacquer is applied.

Chip cards have been known for a long time and are used, for example for the purpose of making payments, in particular in public telephone systems. Chip cards are also used as identification cards.

Chip cards often include an integrated circuit, which can be accessed via an electrically conductive contact zone provided on the surface of the chip card. The contact zone consists of individual contacts which are electrically insulated from one another.

It is known to provide the contacts of the contact zone with an electrically conductive lacquer. It is also possible to color this lacquer. As a result, the contact zone itself can serve as an information carrier if, for example, the logo of the manufacturer of the chip card is printed onto the chip card using the conductive lacquer.

The electrically conductive lacquer is in this case made as a lacquer to which conductive particles are added. It is for instance known to use carbon for black lacquer.

The above described chip cards of this general type have the disadvantage that the lacquer of the contact zone is subject to high frictional wear. Furthermore, it often occurs that the electrically conductive particles oxidize, so that the resistance during access to the contact zone rises in such a way that a satisfactory functioning of the chip card is no longer ensured. In addition, such a surface is dull and matte and thus unattractive.

Published European Patent Application EP 0 340 421 A2 discloses a conductive lacquer which contains a salt based on a tetracyanoquinodimethane complex, a high molecular weight compound and a solvent. The compound contains a surfactant or a silicone oil and/or further substances such as acetals, esters and siloxanes.

Published French Patent Application FR 2 671 417 A1 describes a method of producing a memory card. A dielectric lacquer layer is deposited on an integrated circuit, specifically excluding contact regions. Read/write contacts are then provided with a conductive lacquer, which is in turn covered with a second layer of a dielectric lacquer.

SUMMARY OF THE INVENTION

It is accordingly an object of the invention to provide a chip card and a method of its production which overcome the abovementioned disadvantages of the heretofore-known devices and methods of this general type and, which ensure long-term reliability.

With the foregoing and other objects in view there is provided, in accordance with the invention, a chip card, including:

a contact zone having a region;
an electrically conductive lacquer applied to the region, the electrically conductive lacquer based on an intrinsically conductive plastic material; and pigments added to the electrically conductive lacquer.

In accordance with another feature of the invention, there is provided an electrically nonconductive lacquer applied to the region of the contact zone, conductive particles disposed in the electrically nonconductive lacquer, and the electrically conductive lacquer forming a covering for the conductive particles.

With the objects of the invention in view there is also provided, a method of lacquering a contact zone, which includes:

adding pigments to an intrinsically conductive plastic material for forming an electrically conductive lacquer; and applying the electrically conductive lacquer on a contact zone.

In accordance with another mode of the invention, there is further provided the step of applying an electrically nonconductive lacquer on the contact zone, the electrically nonconductive lacquer including conductive particles having a covering made from the electrically conductive lacquer.

With the objects of the invention in view there is furthermore provided a method of producing a chip card, which includes:

providing a chip card having a contact zone with contacts and interspaces therebetween;
providing a lacquer based on an intrinsically conductive plastic material with pigments added thereto;
covering the interspaces with a stencil; and
coating the contact zone, while the interspaces are covered by the stencil, with the lacquer.

In accordance with another mode of the invention, the step of coating includes coating the contact zone with an electrically nonconductive lacquer having conductive particles with a covering of the lacquer based on the intrinsically conductive plastic material.

In accordance with the invention, an intrinsically conductive plastic material, such as polyaniline, is used for lacquering the contact zone. The term "intrinsically conductive" defines that the plastic material itself conducts without additional conductive particles having to be added to it. The lacquers of this type have a good adhesiveness or adherence to customary materials of contact surfaces of the contact zone.

Further, in accordance with the invention, nonconductive pigments can be added to the lacquer. With such a pigmentation, virtually any color can be achieved. Even luminous colors can be produced when suitable pigments are used. Such colors are impossible to realize on chip cards known in the prior art. In particular green color shades can be produced especially simply, because of the inherent green color of the polyaniline (PANI) that can be used in accordance with the invention.

In addition, through the use of a suitable selection of the lacquer component, the quality of the surface of the chip cards according to the invention can be set to be sufficiently hard. As a result, frictional wear will occur only to a small extent.

According to the invention, an electrically nonconductive lacquer with electrically conductive particles may also be used, wherein the particles are covered with intrinsically conductive plastic material. Silver particles may for example be used as the electrically conductive particles. Given complete wetting or covering of the conductive particles by the intrinsically conductive plastic material, an abrasion-resistant lacquered contact zone, which has a high reliability, is thus produced.

Furthermore, the invention also teaches the use of an intrinsically conductive plastic material for lacquering a contact zone, in particular the contact zone of a chip card or smart card. According to the invention, an intrinsically conductive plastic material, to which in particular nonconductive pigments are added, can also be used for lacquering other contact surfaces.

Finally, the invention also comprises a method of producing a chip card, which has the following steps:

providing a chip card, lacquering the contact zone of a chip card, interspaces between individual contacts of the contact zone being covered by a stencil, wherein the lacquering is carried out using a lacquer based on an intrinsically conductive plastic material.

As a result, in the case of the process according to the invention, the conductivity of the contacts is maintained and a short circuit between the individual contacts is avoided. Using the process according to the invention, durable chip cards that are also protected against frictional wear can be produced.

Thus, using the invention, the contact surfaces of a chip card module can be used as an advertising surface. A decoration of the contact surface can be achieved while at the same time ensuring the functionality of the contact surface. It is thus possible to produce colored symbols, emblems and the like in a durable and impressive manner, especially on golden or silver contact surfaces of a chip card. The variety of colors is in this case not restricted, as is the case with the chip cards known in the prior art, and it is in particular possible to produce luminous or bright colors.

Other features which are considered as characteristic for the invention are set forth in the appended claims.

Although the invention is illustrated and described herein as embodied in a chip card and a corresponding method for producing a chip card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
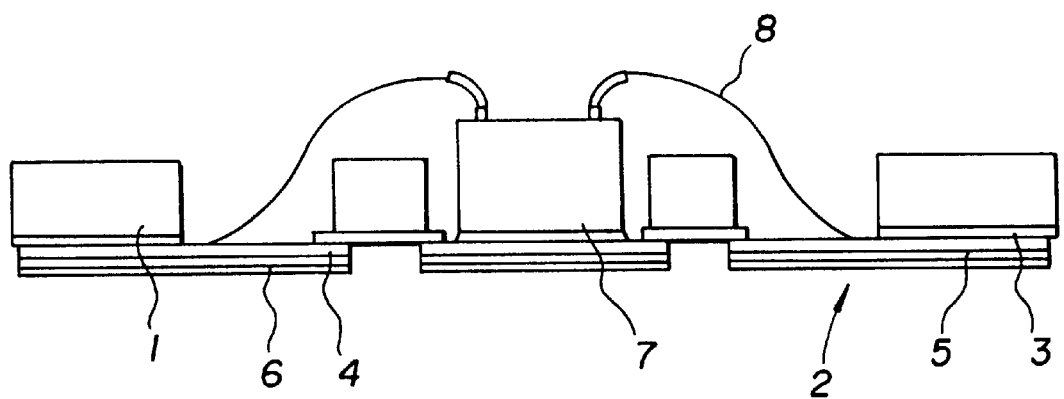
FIG. 1 is a schematic partial cross-sectional view of a chip card in accordance with the invention.

Referring now to the figures of the drawings in detail and first, particularly, to FIG. 1 thereof, there is shown a schematic partial cross-sectional view illustrating the construction of a chip card in accordance with the invention. The chip card includes a carrier 1 which may be made from a glass fiber reinforced epoxy resin. The chip card has contact regions 2. A copper layer 4 is laminated onto the carrier 1 in the contact regions 2 using an adhesive layer 3. An electrically conductive intermediate layer 5 is applied onto the copper layer 4. The electrically conductive intermediate layer 5 may for example be a gold layer. The electrically conductive intermediate layer is preferably only a thin layer such as for example a gold layer having a thickness of 0.1 $\mu$m. A chip 7, having a thickness of for example 200 $\mu$m is connected to contact regions via bond wires 8.

In accordance with the invention, an electrically conductive lacquer layer 6 based on an intrinsically conductive plastic material is disposed as a bottom layer in FIG. 1. It is of course also possible to provide the electrically conductive lacquer layer 6 directly on the copper layer 4, thus eliminating the electrically conductive intermediate layer 5.

The electrically conductive lacquer layer 6 includes the intrinsically conductive plastic material, such as for example polyaniline (PANI). Pigments, in particular electrically nonconductive particles may be added to the electrically conductive lacquer layer 6.

Figure 2:
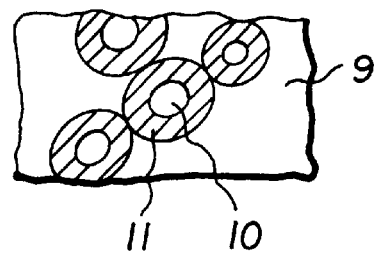
FIG. 2 is a partial cross-sectional view of a lacquer layer with embedded conductive particles.

FIG. 2 illustrates an alternative embodiment of the electrically conductive lacquer layer 6. In this case the electrically conductive lacquer layer 6 includes an electrically nonconductive lacquer material 9. Electrically conductive particles 10, such as silver particles, are added to the nonconductive lacquer material 9. The electrically conductive particles 10 are wetted with or covered by the electrically conductive lacquer 6 or the intrinsically conductive plastic material in order to achieve an electrically conductive layer.

We claim:

1. A chip card, comprising:

an outer contact zone having a region;

an electrically conductive lacquer applied to said region, said electrically conductive lacquer including an intrinsically conductive plastic material; and pigments added to said electrically conductive lacquer.

2. The chip card according to claim 1, wherein said pigments are nonconductive pigments.

3. The chip card according to claim 1, wherein said intrinsically conductive plastic material consists of polyaniline.

4. The chip card according to claim 1, including:

an electrically nonconductive lacquer applied to said region of said outer contact zone; and conductive particles disposed in said electrically nonconductive lacquer, said conductive particles having electrically conductive coatings.

5. A method of lacquering an outer contact zone on a chip card, which comprises:

adding pigments to an intrinsically conductive plastic material for forming an electrically conductive lacquer; and applying the electrically conductive lacquer on an outer contact zone.

6. The method according to claim 5, wherein the pigments have nonconductive properties.

7. The method according to claim 5, which further comprises applying an electrically nonconductive lacquer on the outer contact zone, the electrically nonconductive lacquer including conductive particles having electrically conductive coverings.

8. A method of producing a chip card, which comprises:

providing a chip card having an outer contact zone with contacts and interspaces therebetween;

covering the interspaces with a stencil; and coating the outer contact zone while the interspaces are covered by the stencil with a lacquer based on an intrinsically conductive plastic material with pigments added thereto.

9. The method according to claim 8, wherein the pigments have nonconductive properties.

10. The method according to claim 8, which comprises coating the outer contact zone with an electrically nonconductive lacquer having conductive particles provided with electrically conductive coverings.

* * * * *